United States Patent
Tabata

(10) Patent No.: US 7,136,099 B2
(45) Date of Patent: Nov. 14, 2006

(54) ELECTRONIC CAMERA INCLUDING ENHANCED FUNCTIONALITY TO CHANGE LENGTH-TO-BREADTH RATIOS OF CAPTURED IMAGES

(75) Inventor: Kenji Tabata, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 852 days.

(21) Appl. No.: 10/007,794

(22) Filed: Dec. 5, 2001

(65) Prior Publication Data

US 2002/0089593 A1 Jul. 11, 2002

(30) Foreign Application Priority Data

Dec. 5, 2000 (JP) ............ P 2000-369935

(51) Int. Cl.
*H04N 5/76* (2006.01)
*G03B 17/00* (2006.01)
*G03B 13/10* (2006.01)

(52) U.S. Cl. .............. 348/231.99; 396/381; 396/436

(58) Field of Classification Search ............... 396/435, 396/436, 378, 381, 374; 348/230.1, 222.1, 348/311, 373, 231.6, 219.1, 287, 207.99, 348/335, 36–39, 231.99, 231.2, 231.3
See application file for complete search history.

(56) References Cited

U.S. PATENT DOCUMENTS 5,483,284 A * 1/1996 Ishiguro .................. 348/335
5,486,859 A * 1/1996 Matsuda ................... 348/311
5,557,329 A * 9/1996 Lim ......................... 348/373
5,900,909 A * 5/1999 Parulski et al. .......... 348/231.6
6,064,834 A * 5/2000 Fukuda et al. ............. 396/380
6,477,329 B1* 11/2002 Weng et al. ............... 396/287
6,577,821 B1* 6/2003 Malloy Desormeaux .... 396/374
6,670,986 B1* 12/2003 Ben Shoshan et al. .. 348/219.1
2003/0026610 A1* 2/2003 Malloy Desormeaux .... 396/287
2004/0091257 A1* 5/2004 Brost ......................... 396/380
2004/0201699 A1* 10/2004 Parulski et al. ......... 348/207.99

FOREIGN PATENT DOCUMENTS

JP 64-24333 2/1989
JP 4-37621 6/1992

* cited by examiner

*Primary Examiner*—Vivek Srivastava
*Assistant Examiner*—Kelly Jerabek
(74) *Attorney, Agent, or Firm*—Osha Liang LLP

(57) ABSTRACT

The digital camera 1, when a length-direction range expanding button 14 or a breadth-direction range expanding button 15 is operated, changes the length-direction and breadth-direction image pickup effective ranges of a solid state image pickup device 40 using an image pickup effective range setting table 41. Due to this, there can be obtained picked-up images with a length-to-breadth ratio changed without rotating the main body of the digital camera 1. Also, since the length-direction and breadth-direction image pickup effective ranges are adjusted such that the area of the image pickup effective ranges of the solid state image pickup device 40 can provide a substantially constant value, there can be always obtained an image of good quality.

2 Claims, 4 Drawing Sheets

| NUMBER | HORIZONTAL DIRECTION | LATERAL DIRECTION |
|---|---|---|
| 1 | 12mm | 25mm |
| 2 | 13mm | 23mm |
| 3 | 15mm | 20mm |
| 4 | 16mm | 19mm |
| 5 | 17mm | 17mm |
| 6 | 19mm | 16mm |
| 7 | 20mm | 15mm |
| 8 | 23mm | 13mm |
| 9 | 25mm | 12mm |

ELECTRONIC CAMERA INCLUDING ENHANCED FUNCTIONALITY TO CHANGE LENGTH-TO-BREADTH RATIOS OF CAPTURED IMAGES

BACKGROUND OF THE INVENTION

1. Field of the Invention

The present invention relates to an electronic camera for recording into a record medium images picked up using a solid state image pickup device such as a CCD.

2. Related Art

Conventionally, there is known an electronic camera, or, a so called digital camera which picks up the images of a subject using a solid state image pickup device such as a CCD. In the digital camera, images photographed (picked-up images) are recorded into a record medium such as a floppy disk or a memory card in the form of electronic data. Also, the digital camera has a reproduction function to display the picked-up images recorded in the memory card on the screen of a display such as a television.

In the case of an ordinary digital camera, since the ratio of the length and breadth of the screen of a display such as a television for displaying the picked-up images is 3:4, there is used a solid state image pickup device having a length-to-breadth ratio of 3:4.

By the way, when picking up the images of a subject, a user judges whether the images of the subject should be picked up with more breadth than length or with more length than breadth; and, when picking up the images of the subject with more length than breadth, the user turns the main body of the digital camera by 90° before the subject images are picked up. On the other hand, because the number of cases in which the subject images are picked up with more breadth than length is larger than the number of cases in which the subject images are picked up with more length than breadth, the digital camera is conventionally structured in such a shape that allows the fingers and palm of the user to touch the digital camera main body closely when the subject images are picked up with more breadth than length, thereby allowing the user to hold the camera main body stably and making it difficult for the camera main body to be moved slightly. Therefore, when picking up the subject images with more length than breadth by turning the camera main body by 90°, the holding of the camera main body is unstable and the slight camera movement is easy to occur, which makes it difficult to obtain images of good quality.

In order to solve the above problem, in the Examined Japanese Patent Application Publication No. Hei4-37621 or in the Examined Japanese Utility Model Application Publication No. Sho64-24333, there is proposed a digital camera which is capable of picking up the images of a subject selectively with more breadth than length or with more length than breadth without turning the main body of the digital camera.

[Problems to be Solved]

In the digital camera disclosed in the Examined Japanese Patent Application Publication No. Hei4-37621, an image pickup device hold table with a solid state image pickup device held thereon is disposed so as to be rotatable with respect to the main body of the digital camera and, in operation, by rotating the image pickup device hold table using a motor, the subject images can be picked up selectively with more breadth than length or with more length than breadth with no need to turn the digital camera main body. However, this structure requires a rotation mechanism for rotating the image pickup device hold table, which not only increases the size of the digital camera main body to thereby degrade the operation efficiency thereof but also increases the cost of the digital camera.

On the other hand, in the case of the digital camera disclosed in the Examined Japanese Utility Model Application Publication Sho64-24333, when image pickup with more length than breadth is selected, by setting the two right and left sides of the solid state image pickup device out of the image pickup effective range thereof, that is, by cutting the two right and left sides, image pickup with more length than breadth or image pickup with more breadth than length can be executed selectively without turning the camera main body. However, according to this structure, in the case of the image pickup with more length than breadth, the number of pixels of a solid state image pickup device used in this image pickup is reduced greatly, which makes it difficult to obtain images of good quality.

SUMMARY OF THE INVENTION

In view of the above-mentioned related art circumstances, it is an object of the invention to provide an electronic camera which not only can change the length-to-breadth ratio of the picked-up images without turning the main body of the electronic camera but also can always provide images of good quality at a low cost without degrading the operation efficiency of the camera.

[Means for Solving the Problems]

In attaining the above object, according to a first aspect of the invention, there is provided an electronic camera, comprising:

image record member for recording images, which are formed within length-direction image pickup effective ranges and breadth-direction image pickup effective ranges set in a solid state image pickup device disposed in the main body of the electronic camera, into a record medium in the form of electronic data;

image pickup effective range change member for changing the length-direction image pickup effective ranges and breadth-direction image pickup effective ranges in the solid state image pickup device; and, an image pickup effective range setting table having a register of a plurality of records respectively indicating mutual correspondences between the length-direction image pickup effective ranges and breadth-direction image pickup effective ranges, wherein the image pickup effective range change member includes a length-direction range change button capable of executing an input operation to increase the length-direction image pickup effective ranges, and a breadth-direction range change button capable of executing an input operation to increase the breadth-direction image pickup effective ranges; and, the image pickup effective range change member is member which, when the length-direction range change button or said breadth-direction range change button is operated, changes the length-direction image pickup effective ranges and breadth-direction image pickup effective ranges using the image pickup effective range setting table.

In the above structure, in the image pickup effective range setting table, there are registered a plurality of records respectively indicating mutual correspondences between the length-direction image pickup effective ranges and breadth-direction image pickup effective ranges.

In case where the length-direction range change button is operated, the length-direction image pickup effective range in the solid image pickup device disposed in the camera main body is increased. At the then time, the breadth-direction image pickup effective range is also changed using the image pickup effective range setting table.

Similarly, in case where the breadth-direction range change button is operated, the breadth-direction image pickup effective range in the solid image pickup device disposed in the camera main body is increased. At the then time, the length-direction image pickup effective range is also changed using the image pickup effective range setting table.

As described above, by operating the length-direction range change button or breadth-direction range change button, the two length- and breadth-direction image pickup effective ranges in the solid state image pickup device can be changed.

Here, in case where records indicating mutual correspondences between the length-direction image pickup effective ranges and breadth-direction image pickup effective ranges are registered in the image pickup effective range setting table in such a manner that the area of the image pickup effective ranges in the solid state image pickup device can provide a substantially constant value, when the length-direction image pickup effective range is increased, the breadth-direction image pickup effective range is decreased; and, on the other hand, when the breadth-direction image pickup effective range is increased, the length-direction image pickup effective range is decreased. Therefore, by operating the length-direction range change button or breadth-direction range change button, the length-to-breadth ratio of the picked-up images can be changed.

Also, as described above, in case where the area of the image pickup effective ranges in the solid state image pickup device is set so as to provide a substantially constant value, even when the length-to-breadth ratio of the picked-up image is changed, the number of pixels used for image pickup is substantially the same. In other words, even when the length-to-breadth ratio of the picked-up image is changed, there is no possibility that the quality of the picked-up images can be degraded, thereby being able to always obtain picked-up images of good quality.

Also, since it is not necessary for the camera main body to provide a mechanism such as a motor for rotating the solid state image pickup device, an increase in the size of the camera main body can be controlled, which can prevent the lowered operation efficiency of the electronic camera. Also, an increase in the cost of the electronic camera can be controlled.

According to a second aspect of the invention, there is provided an electronic camera, comprising:

image record member for recording images, which are formed within length-direction image pickup effective ranges and breadth-direction image pickup effective ranges set in a solid state image pickup device disposed in the main body of the electronic camera, into a record medium in the form of electronic data; and, image pickup effective range change member for changing the length-direction image pickup effective ranges and breadth-direction image pickup effective ranges in the solid state image pickup device;

wherein the image pickup effective range change member includes a length-direction range change button capable of executing an input operation to increase the length-direction image pickup effective ranges, and a breadth-direction range change button capable of executing an input operation to increase the breadth-direction image pickup effective ranges; and, the image pickup effective range change member is member which, when the length-direction range change button or breadth-direction range change button is operated, changes the length-direction image pickup effective ranges and breadth-direction image pickup effective ranges in such a manner that the area of the image pickup effective ranges in the solid state image pickup device can provide a constant value.

In the above structure, there is eliminated the image pickup effective range setting table set forth in the first aspect of the invention; and, the length-direction image pickup effective ranges and breadth-direction image pickup effective ranges are changed in linking with each other so that the area of the image pickup effective ranges in the solid state image pickup device can provide a constant value. Specifically, in case where the length-direction image pickup effective range is changed, the breadth-direction image pickup effective range is changed according to the changed length-direction image pickup effective range so that the area of the image pickup effective ranges in the solid state image pickup device can provide a constant value. Also, in case where the breadth-direction image pickup effective range is changed, the length-direction image pickup effective range is changed according to the changed breadth-direction image pickup effective range so that the area of the image pickup effective ranges in the solid state image pickup device can provide a constant value.

Therefore, according to the second aspect of the invention, there can be obtained a substantially equivalent effect to the electronic camera according to the first aspect of the invention.

Also, the length-direction and breadth-direction image pickup effective ranges may also be set such that they can be changed independently. In this case, for example, there may be disposed a button for increasing the length-direction image pickup effective ranges, a button for decreasing the length-direction image pickup effective ranges, a button for increasing the breadth-direction image pickup effective ranges, and a button for decreasing breadth-direction image pickup effective ranges.

By the way, alternatively, there may used a single button which serves as both the button for increasing the length-direction (or breadth-direction) image pickup effective ranges and the button for decreasing the length-direction (or breadth-direction) image pickup effective ranges. For example, when the button is operated, the image pickup effective range is increased; and, in case where the button is operated when the image pickup effective range is the largest, the image pickup effective range is decreased down to the smallest value.

BRIEF DESCRIPTION OF THE DRAWINGS

[FIG. 1]

FIG. 2 is a block diagram of the structure of the present digital camera;

FIG. 3 is a view of a solid state image pickup device;

FIG. 4 is an image pickup effective range setting table; and,

FIG. 5 is an explanatory view of variations in the image pickup effective ranges set in the solid state image pickup device.

DETAILED DESCRIPTION OF THE PREFERRED EMBODIMENTS

Figure 1A:
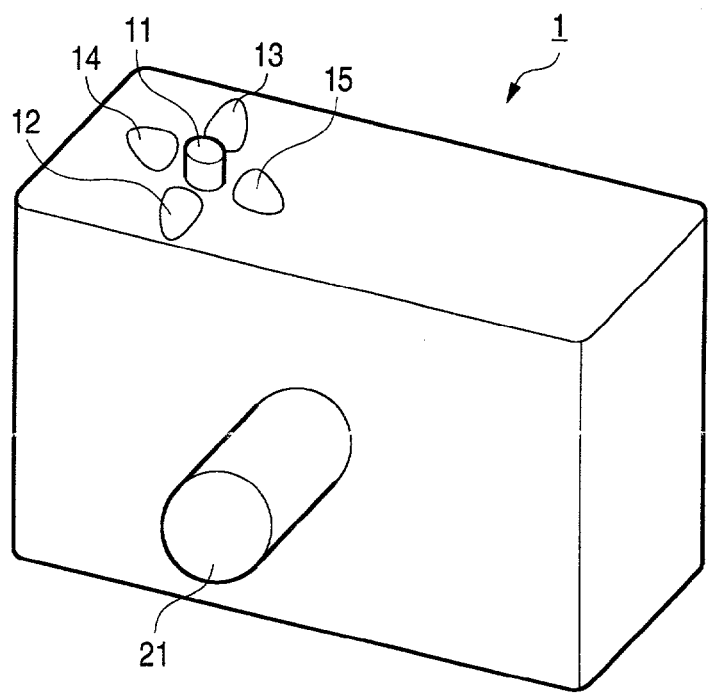
FIGS. 1A and 1B are perspective views of the external shape of a digital camera according to an embodiment of the invention.
Figure 1B:
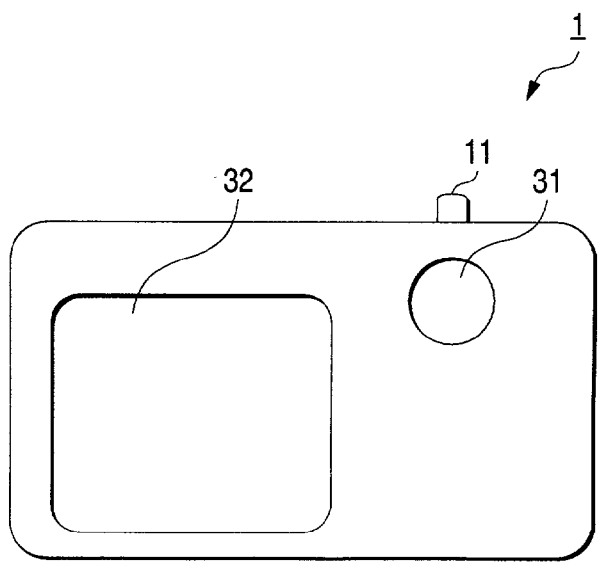
Figure 2:
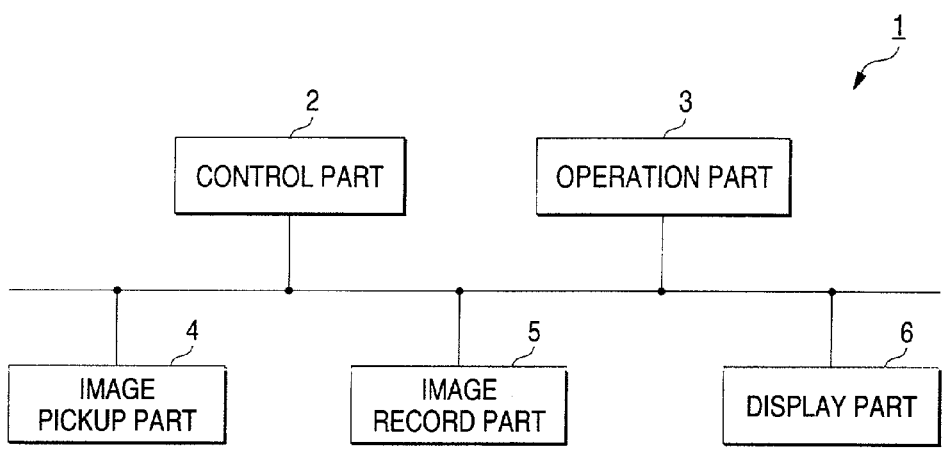
[FIG. 2]

Now, description will be given below in detail of a digital camera according to an embodiment of the invention. FIG. 1A is a perspective view of the external shape of a digital camera according to the present embodiment, and FIG. 1B is a back view of the present digital camera. Also, FIG. 2 is a block diagram of the structure of the present digital camera. The digital camera 1 (which is hereinafter referred to as a camera 1 simply) according to the present embodiment comprises a control part 2 for controlling the operation of the main body of the camera 1, an operation part 3 for executing an input operation with respect to the camera 1 main body, an image pickup part 4 for picking up (photographing) the images of a subject, an image record part 5 for recording the images of the subject picked up by the image pickup part 4, and a display part 6 for displaying the subject images recorded in the image record part 5. The operation part 3 includes a shutter 11 disposed on the upper surface of the camera 1 main body, a zoom-up button 12, a zoom-down button 13, a length-direction range enlarge button 14, and breadth-direction range enlarge button 15 respectively disposed in the periphery of the shutter 11.

The image pickup part 4 forms the subject images on a solid state image pickup device disposed in the interior of the camera 1 main body using an image pickup lens 21. The image pickup part 4 also includes a stop mechanism (not shown). The above solid state image pickup device is a CCD or a CMOS.

The image record part 5, when the shutter 11 is operated, records the subject images formed on the solid state image pickup device into a record medium as picked-up images in the form of electronic data. In this case, the picked-up images to be recorded into the record medium in the form of electronic data are not the subject images formed over the entire areas of the solid state image pickup device but the subject images formed in image pickup effective ranges which are set in the solid state image pickup device. The subject images formed out of the image pickup effective ranges set in the solid state image pickup device are cut and thus they are not recorded as the picked-up images.

By the way, description will be given later of the image pickup effective ranges set in the solid state image pickup device. The above-mentioned record medium is a RAM incorporated in the camera 1 main body, or a floppy disk or a memory card which can be freely mounted into and removed from the camera 1 main body.

The display part 6 includes an electronic viewfinder 31 and a liquid crystal display 32. The electronic viewfinder 31 includes a display for displaying the subject images formed in the image pickup effective ranges set in the solid state image pickup device. Therefore, by viewing the electronic viewfinder 31, a user is able to confirm the picked-up images which, when the shutter 11 is operated, are to be recorded in the image record part in the form of electronic data. On the other hand, the liquid crystal display 32 is capable of displaying subject images similar to the subject images viewed through the electronic viewfinder 31, or the picked-up images recorded in the image record part 5. On the camera main body 1, there is disposed a switch (not shown) which is used to select the images (the above-mentioned subject images or the above-mentioned picked-up images) to be displayed on the liquid crystal display 32.

Also, in case where the zoom-up button 12 disposed on the operation part 3 is operated, the camera 1 adjusts an image pickup lens 21 to thereby enlarge the subject images formed on the solid state image pickup device; and, in case where the zoom-down button 12 disposed on the operation part 3 is operated, the camera 1 adjusts an image pickup lens 21 to thereby reduce the subject images formed on the solid state image pickup device.

Figure 3:
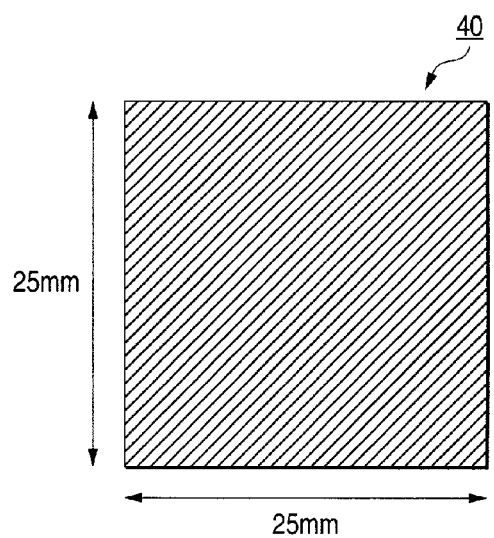
[FIG. 3]

Next, description will be given below of the picked-up image effective ranges set in the solid state image pickup device. The solid state image pickup device 40, which is disposed in the camera 1 main body according to the present embodiment, is one inch (approx. 25 mm) square (see FIG. 3). The camera 1, when the shutter 11 is operated, records into the record medium, in the form of electronic data, the subject images formed within the image pickup effective ranges in the solid state image pickup device 40 one inch square shown in FIG. 3. As described above, the image pickup effective ranges can be changed.

Figure 4:
[FIG. 4]

In the control part 2, there is stored an image pickup effective range setting table 41 which is shown in FIG. 4. In the image pickup effective range setting table 41, there are registered a plurality of (in FIG. 4, nine) image pickup effective range records (which ares hereinafter referred to as records simply) in which indicate mutual correspondences between the length-direction image pickup effective ranges and the breadth-direction image pickup effective ranges. Each of the records registered in the image pickup effective range setting table 41 is formed in such a manner that the area of the image pickup effective ranges is substantially 300 mm$^2$. By the way, by increasing the total number of records registered in the image pickup effective range setting table 41, selection of the length-to-breadth ratio can be diversified further.

The camera 1 decides the image pickup effective ranges according to the records selected. Specifically, when there is selected a record having a length-direction image pickup effective range of 12 mm and a breadth-direction image pickup effective range of 25 mm shown in FIG. 4, the camera 1 decides, as the image pickup effective ranges, a range which extends up to 6 mm respectively in the upward and downward directions from the center of the solid state image pickup device 40 as well as extends up to 12.5 mm respectively in the right and left directions from the center of the solid state image pickup device 40. That is, in the respective records, the length-direction image pickup effective range represents a distance extending in the upward and downward directions with respect to the center of the solid state image pickup device 40, and the breadth-direction image pickup effective range represents a distance extending in the right and left directions with respect to the center of the solid state image pickup device 40.

The image pickup effective ranges of the solid state image pickup device 40 can be changed by operating the previously described length-direction range expanding button 14 or breadth-direction range expanding button 15. Whenever the length-direction range expanding button 14 is operated, the control part 2 selectively changes the records registered in the image pickup effective range setting table 41 in the ascending order of the record numbers; and, whenever the breadth-direction range expanding button 15 is operated, the control part 2 selectively changes the records registered in the image pickup effective range setting table 41 in the descending order of the record numbers.

That is, whenever the length-direction range expanding button 14 is operated, the camera 1 changes the records in such order of 1-2-3- - - as shown in FIG. 4; and, whenever the breadth-direction range expanding button 15 is operated, the camera 1 changes the records in such order of 9-8-7 - - - as shown in FIG. 4. And, the image pickup effective ranges of the solid state image pickup device 40 can be changed according to the above-changed records.

As can be seen clearly from the above description, by operating either of the length-direction range expanding button 14 or the breadth-direction range expanding button 15, the length-direction image pickup effective ranges and breadth-direction image pickup effective ranges in the solid state image pickup device 40 can be both changed.

Figure 5:
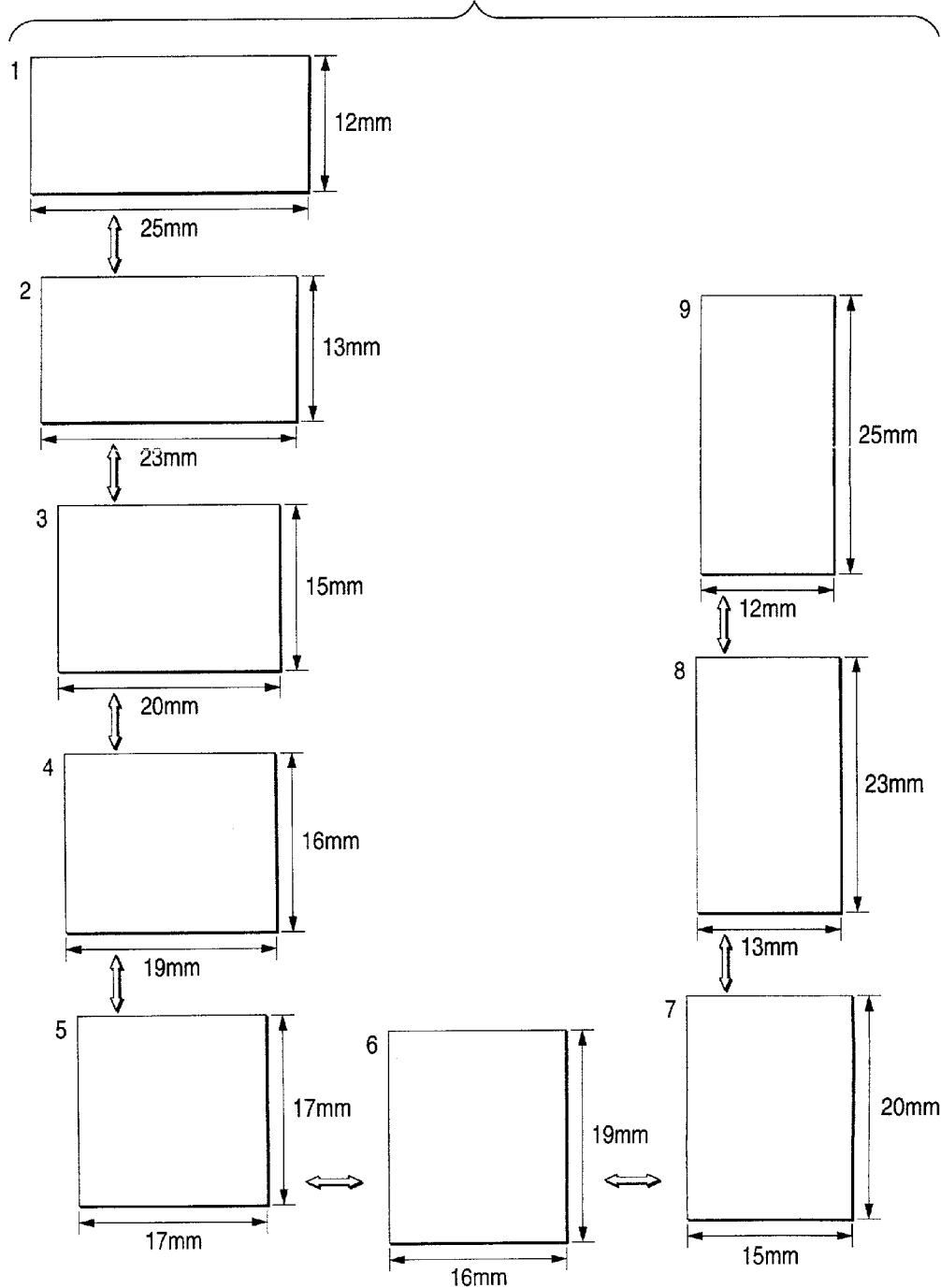
[FIG. 5]

Now, FIG. 5 shows the variations of the image pickup effective ranges in the solid state image pickup device 40. In this figure, the image pickup effective ranges in the solid state image pickup device 40 are shown for every records recorded in the image pickup effective range setting table 41. Obviously from FIG. 5, as the image pickup effective ranges in the solid state image pickup device 40, there can be selected the ranges which are long in the breadth direction as well as long in the length direction. Also, it is also possible to select an image pickup effective range which is square.

As described above, since the above-mentioned image pickup effective ranges are selected in such a manner that not only the subject images formed in the image pickup effective ranges are prevented from being the picked-up images but also the camera 1 main body is not turned, an image long in the length direction or an image long in the breadth direction can be picked up selectively.

Also, as described above, in the respective records, because the length-direction and breadth-direction image pickup effective ranges are set such that the areas of the mutually corresponding image pickup effective ranges provide a substantially constant value, the number of pixels within the image pickup effective ranges are substantially the same. Therefore, even in case where the length-to-breadth ratio of the picked-up images are changed, there is no fear that the quality of the picked-up images can be degraded.

Now, description will be given below of the operation of the camera 1 according to the present embodiment when it picks up the images of a subject. In the camera 1, subject images are formed on the solid state image pickup device 40 through the image pickup lens 21. At the then time, by viewing the electronic viewfinder 31, the user is able to confirm the subject images formed on the solid state image pickup device 40. By the way, the subject images formed on the solid state image pickup device 40 are the subject images that are formed within the image pickup effective ranges of the solid state image pickup device 40 currently selected. Also, as previously described, the subject images that are formed within the image pickup effective ranges of the solid state image pickup device 40 can be displayed on the liquid crystal display 32 as well.

Here, when changing the length-to-breadth ratio in picking up the images of the subject, the user may operate the length-direction range expanding button 14 or breadth-direction range expanding button 15. Due to this, the records in the image pickup effective range setting table 41 are selectively changed and the image pickup effective ranges of the solid state image pickup device 40 are thereby changed.

In this operation, the subject images displayed on the electronic viewfinder 31 and liquid crystal display 32 are also changed in accordance with the change of the image pickup effective ranges.

As described above, by operating the length-direction range expanding button 14 or breadth-direction range expanding button 15, the length-to-breadth ratio can be changed. Also, the subject images after the length-breadth ratio is changed can be confirmed by viewing the electronic viewfinder 31 or by looking at the liquid crystal display 32. Therefore, while operating the length-direction range expanding button 14 or breadth-direction range expanding button 15, the length-to-breadth ratio, which can provide a desired picked-up image, can be selected simply.

Also, even in case where the length-to-breadth ratio is changed in the above-mentioned manner, since the number of pixels within the image pickup effective ranges of the solid state image pickup device 40 is substantially the same, there is no fear that the quality of the picked-up image can be degraded.

Further, because the camera is structured such that the change of the length-to-breadth ratio is executed by a software processing, an increase in size of the camera main body can be controlled as well as there can be avoided the problems that the operation efficiency of the camera main body can be degraded and the manufacturing cost thereof can be increased.

By the way, in the present embodiment, the image pickup effective ranges of the solid state image pickup device 40 are changed using the image pickup effective range setting table 41. However, the image pickup effective range setting table 41 can be omitted.

Specifically, while the area of the image pickup effective range is set at, for example, 500 mm$^2$, in accordance with the operation of the length-direction range expanding button 14 or breadth-direction range expanding button 15, the length-direction and breadth-direction image pickup effective ranges may be changed such that the area of the image pickup effective ranges of the solid state image pickup device 40 can provide a previously set value. In this case, since the length-direction (or the breadth-direction) image pickup effective ranges can be changed through the operation of the length-direction range expanding button 14 (or the breadth-direction range expanding button 15), selection of the length-to-breadth ratio can be diversified.

Also, in the present embodiment, there is employed the structure that the length-direction and the breadth-direction image pickup effective ranges can be changed in linking with each other. However, it is also possible to employ another structure that the length-direction and the breadth-direction image pickup effective ranges can be changed independently. In this case, there may be disposed, for example, a button for increasing the length-direction image pickup effective range, a button for reducing the length-direction image pickup effective range, a button for increasing the breadth-direction image pickup effective range, and a button for reducing the breadth-direction image pickup effective range.

By the way, a single button may also be used to serve as both the button for increasing the length-direction (or breadth-direction) image pickup effective ranges and the button for reducing the length-direction (or breadth-direction) image pickup effective ranges. For example, in case where the button is operated, the image pickup effective ranges may be increased; and, when the image pickup effective ranges are set in the largest value, in case where the button is operated, the image pickup effective ranges may be changed back down to the smallest value.

[Effects of the Invention]

As has been described heretofore, according to the invention, the picked-up images with the length-to-breadth ratio thereof changed can be obtained without turning the camera main body. Also, since the length-to-breadth ratio of the picked-up images is changed by a software processing, an increase in the size of the camera main body can be controlled, the degraded operation efficiency of the camera main body can be prevented, and an increase in the manufacturing cost thereof can be prevented. Further, even in case where the length-to-breadth ratio of the picked-up images is changed, the number of pixels used for the image pickup is substantially the same, the lowered image quality can be prevented and thus there can be always obtained an image of good quality.

What is claimed is:

1. A digital camera, comprising:
   an image record member for recording images, which are formed within length-direction image pickup effective ranges and breadth-direction image pickup effective ranges set in a solid state image pickup device disposed in a main body of said digital camera, into a record medium in a form of electronic data;
   an image pickup effective range change member for changing the length-direction image pickup effective ranges and the breadth-direction image pickup effective ranges in said solid state image pickup device; and
   an image pickup effective range setting table having a register of a plurality of records respectively indicating correspondences between the length-direction image pickup effective ranges and the breadth-direction image pickup effective ranges,
   wherein said image pickup effective range change member includes a length-direction range change button capable of executing an input operation to increase the length-direction image pickup effective ranges, and a breadth-direction range change button capable of executing an input operation to increase the breadth-direction image pickup effective ranges; and when said length-direction range change button or said breadth-direction range change button is operated, said image pickup effective range change member changes the length-direction image pickup effective ranges and breadth-direction image pickup effective ranges using the image pickup effective range setting table.

2. A digital camera, comprising:
   an image record member for recording images, which are formed within length-direction image pickup effective ranges and breadth-direction image pickup effective ranges set in a solid state image pickup device disposed in a main body of said digital camera, into a record medium in a form of electronic data;
   an image pickup effective range change member for changing the image pickup area of said images set in said solid state image pickup device, that is, said length-direction image pickup effective ranges and said breadth-direction image pickup effective ranges; and
   an image pickup effective range setting table having a register of a plurality of records respectively indicating correspondences between the length-direction image pickup effective ranges and the breadth-direction image pickup effective ranges,
   wherein when there is input a change instruction for said length-direction range change button or said breadth-direction range change button, said image pickup effective range change member changes the length-direction image pickup effective ranges and the breadth-direction image pickup effective ranges using the image pickup effective range setting table.

* * * * *